Sept. 10, 1946.   C. H. SMITH ET AL   2,407,388
CAGE FOR BALL BEARINGS
Filed June 8, 1945

INVENTORS
Charles Henry Smith
Ernest George Longman
BY C. P. Goepel
their ATTORNEY Patented Sept. 10, 1946

2,407,388

UNITED STATES PATENT OFFICE 2,407,388

CAGE FOR BALL BEARINGS

Charles Henry Smith and Ernest George Longman, Chelmsford, England, assignors to Norma Hoffmann Bearings Corporation, Stamford, Conn.

Application June 8, 1945, Serial No. 598,302
In Great Britain June 12, 1944

1 Claim. (Cl. 308—201)

The present invention relates to a cage or separator for ball bearings, such cage being of the one-piece open-sided type comprising an annular side member provided with a plurality of pockets, each of which serves to house a ball.

The main objects of the present invention are to provide a cage of the kind described in which circumferential resilience of the cage to facilitate differential displacement of the balls is combined with radial rigidity to prevent distortion of the cage from its correct annular shape and diameter.

According to the invention the cage is made of a suitable resilient material and is comprised of an annular side member of substantially channel or U section, from the periphery of which integral wings or limbs project to form pockets for the balls. These wings are twisted along their length in such a way that their outer ends are in substantially radial planes, and are suitably shaped so that each ball is entirely housed between smooth surfaces at the outer ends of two wings and cannot make contact with the side member or sheared corners. The wings thus form cantilever leaf springs which are resilient circumferentially but radially rigid and can readily permit and conform to any differential displacement of the balls which may occur in their passage round the raceways of the bearing. The result of the construction described is that, in addition to circumferential resilience of the wings, lateral and radial strength and rigidity are imparted to the cage itself.

The device can be pressed as a whole from sheet material, and the channel section side member forms a reservoir for lubricant.

Figure 1:
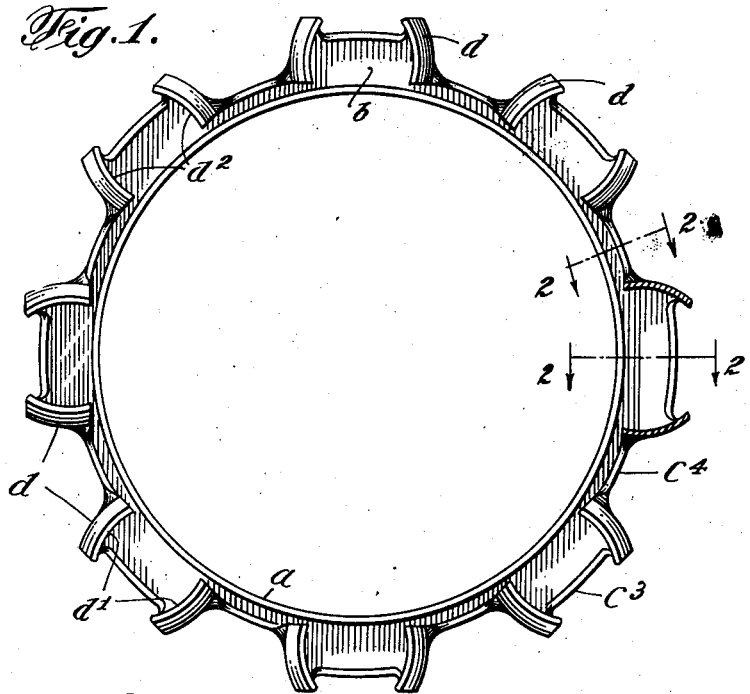
Figure 2:
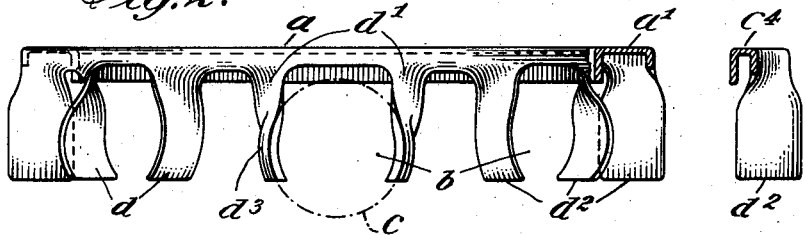
Figure 3:
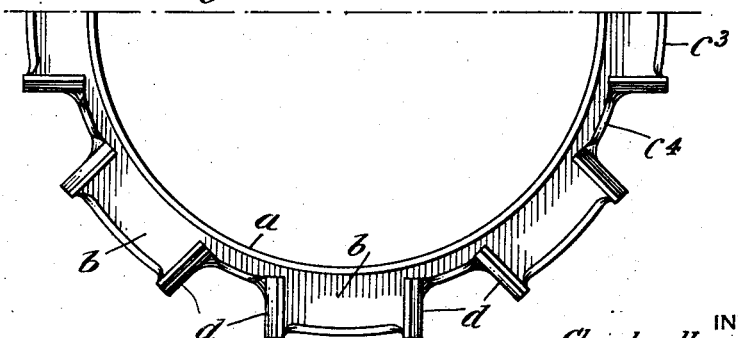

Two forms of construction of the invention are illustrated in the annexed drawing, in which Fig. 1 is a front view, and Fig. 2 is a plan view of one form of construction, Fig. 3 is a part front view of a slightly modified form of construction.

In the construction shown in Figs. 1 and 2, the cage is supported on the balls and does not make contact with the races. For this purpose the inner surfaces at the outer ends of the wings conform substantially to the contour of the balls which they partially embrace.

In these figures $a$ is an annular side member which is of channel section as shown at $a'$ in Fig. 2. The cage is formed with eight pockets $b$, each serving to house one ball $c$, and each bounded circumferentially by two limbs $d$ rigidly supported at their base portions $d'$ by the member $a$ with which they are integral, whilst their outer ends $d^2$ are capable of some circumferential resilience, the limbs $d$ thus acting as cantilever leaf springs. The depth of the channel is greater between two pocket-forming surfaces of limbs $d$ than between two adjacent non-pocket forming surfaces of limbs, as can be seen from Fig. 1 where $c^3$ represents the outer edge of one channel portion and $c^4$ the outer edge of another channel portion. In order to increase the circumferential flexibility of the limbs $d$ they are twisted, as shown at $d^3$, into two substantially radial planes.

In the construction shown in Fig. 3, the cage is supported on the inner race of its bearing and differs only from that previously described insofar as the pockets are of cylindrical shape.

It will be evident that the cage can be supported on the outer race if desired.

It will be noted that a pair of adjacent limbs $d$ has inner opposed or adjacent surfaces which form a ball pocket. The outer surfaces of such a pair of limbs do not form part of a ball pocket. In consequence, the pairs of limbs form alternate ball pocket spaces and non pocket spaces. The wings are oppositely twisted lengthwise so that their outer ends are in substantially radial planes.

We have described several forms of our invention, but obviously various changes may be made in the details disclosed without departing from the spirit of the invention as set out in the following claim.

We claim:

In a cage for ball bearings of the one-piece open sided type the combination of an annular channel section side member, a plurality of limbs rigidly supported at their base portions by said channel section side member and integral therewith, each limb having a twist and each pair of adjacent limbs having twists in opposite directions, and having their outer ends in substantially radial planes and of circumferential resiliency and acting as cantilever leaf springs and having their base portions concentric with the axis of the cage, the adjacent inner surfaces of said pairs of wings forming pockets each to hold the ball, and the adjacent outer surfaces of said pairs of limbs forming non-pocket forming surfaces.

CHARLES HENRY SMITH.
ERNEST GEORGE LONGMAN.